Oct. 29, 1968    I. M. LACHMAN    3,408,430
METHOD FOR IMPROVING THE VISIBLE AND INFRARED TRANSMISSION
OF HOT PRESSED MAGNESIUM FLUORIDE
Filed March 17, 1965

INVENTOR
IRWIN M. LACHMAN

BY *Sughrue, Rothwell, Mion, Zinn & Macpeak*

ATTORNEYS

:::
United States Patent Office 3,408,430
Patented Oct. 29, 1968

3,408,430
METHOD FOR IMPROVING THE VISIBLE AND INFRARED TRANSMISSION OF HOT PRESSED MAGNESIUM FLUORIDE
Irwin M. Lachman, Corning, N.Y., assignor to Corning Glass Works, Corning, N.Y., a corporation of New York
Filed Mar. 17, 1965, Ser. No. 440,496
3 Claims. (Cl. 264—1)

ABSTRACT OF THE DISCLOSURE

A process for producing bodies of magnesium fluoride having improved visible and infrared transmission characteristics comprising heating magnesium fluoride powder in an oxygen containing atmosphere at a temperature in the range of from 350° to 850° C., then heating the powder under vacuum at a temperature in the range of from 500° to 900° C., to remove water and reaction products of water and finally hot pressing the treated powder to a body of the desired shape.

---

This invention relates to a method for increasing the visible and infrared transmission properties of hot pressed bodies of magnesium fluoride.

Optical elements formed from hot pressed magnesium fluoride have recently become available. These bodies are usually made by selecting the best available grade of magnesium fluoride powder and consolidating it under heat and pressure in a hot press furnace to form a shaped body. Although single crystals of magnesium fluoride are usually colorless, it has been found that the hot pressed material varies in color from almost colorless to gray to black. This color interferes with the visible transmission and to a less extent with the infrared transmission of the hot pressed body.

Commercially available magnesium fluoride powders contain considerable amounts of water and reaction products of water and magnesium fluoride. Water and associated compounds manifest themselves in the infrared transmission curves of hot pressed magnesium fluoride as characteristically strong absorption bands at and around 2.8, 5.0 and 6.7 micron wavelengths. It is essential that these absorption bands be eliminated in magnesium fluoride bodies which are to be used in producing high quality infrared transmitting elements.

The prior art reveals several attempts at treating magnesium fluoride to improve the optical properties of hot pressed magnesium fluoride elements. One such treatment involves heating magnesium fluoride in the presence of a reactive fluoride-containing material. Another method comprises heating powdered magnesium fluoride under vacuum to a temperature of at least 600° C. to remove some of the water contained therein. However, these prior techniques have not been completely successful.

Accordingly, it is the object of this invention to provide a method for treating magnesium fluoride to increase the visible and infrared transmission properties of hot pressed bodies formed therefrom.

Other objects of this invention will be pointed out in the following description and claims and illustrated in the accompanying drawings.

Figure 1:
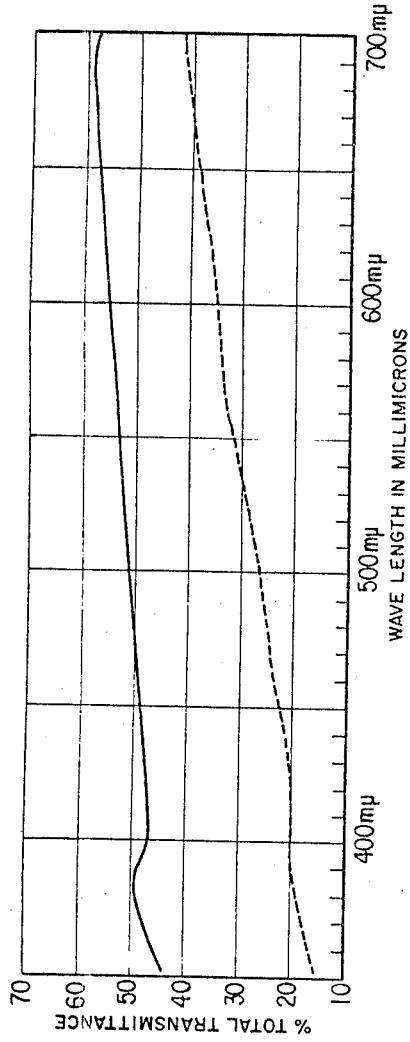
FIGURE 1 is a graph showing the effect of the method of this invention upon the visible transmission properties of hot pressed magnesium fluoride.

These and other objects of this invention are accomplished by a two-step process which produces magnesium fluoride capable of being hot pressed into elements having excellent optical properties. In accordance with this invention, magnesium fluoride is pre-treated by heating in an oxidizing atmosphere at a temperature of from 350° to 850° C. In a second step, the magnesium fluoride is heated in vacuum at a temperature in the range of from 500° C. to 900° C. The combination of these steps greatly improves the optical properties of hot pressed magnesium fluoride elements as will be more fully explained below.

The oxidizing treatment is accomplished by heating magnesium fluoride in air or an oxygen-containing atmosphere at a temperature of from 350° C. to 850° C. for a period of time sufficient to oxidize organic impurities, such as lint, which are contained therein.

It has been found that lint and other organic impurities, present in substantially all available sources of magnesium fluoride, are the cause of the undesirable color in magnesium fluoride optical elements. In accordance with this invention, these color forming impurities are oxidized to volatile products which are removed from the magnesium fluoride.

The heating time employed in the oxidizing step will vary with the particular temperature employed, the size of the piece to be treated, and the amount of crystal growth that can be tolerated. Excessive amounts of crystal growth are to be prevented since it can interfere with densification upon hot pressing. Because of the numerous factors influencing length of heating time, it is difficult to limit quantitatively the heating time at various temperatures. However, optimum results are obtained by heating at a temperature of from 450° C. to 500° C. With temperatures in this range, the length of heating time is immaterial, although good results are obtained by heating for 30 minutes and there is no particular advantage in deviating from this length of time. With temperatures up to 700° C., heating for between 15 and 30 minutes gives good results. At higher temperatures, it is preferable to keep the heating time short, on the order of one to fifteen minutes.

The oxidizing treatment can be performed in the mold used for hot pressing or in a separate furnace. In commercial usage, it is preferable to treat the magnesium fluoride in a separate furnace so that the expensive hot pressing equipment is not tied up in the non-pressing operation. When air is the oxidizing gas, the magnesium fluoride can simply be heated while exposed to the ambient atmosphere. It is preferred, however, to use a flow of air or oxygen, since this will sweep the volatile impurities from the magnesium fluoride. During the oxidizing treatment, the magnesium fluoride can be in the form of an unconsolidated powder or a lightly pressed compact.

The vacuum treatment is accomplished by heating the magnesium fluoride under vacuum at a temperature of between 500° C. and 900° C. for a length of time sufficient to remove water and its reaction products therefrom. Here again, it is difficult to quantitatively limit the length of heating time at different temperatures. However, heating under vacuum for any length of time will improve the transmission properties of the sample. At a temperature of 700° C., it has been found that maximum transmission is obtained by heating for 90 minutes. It is preferred that the pressure during this treatment step be approximately one millimeter or lower. Higher pressures have the same effect but, of course, slower rates of water removal are obtained. Since water vapor is removed from the magnesium fluoride during this step, exact pressure measurement is difficult.

As in the oxidizing treatment, the magnesium fluoride can be in the form of an unconsolidated powder or a lightly pressed compact during the vacuum treatment. Vacuum treatment can be accomplished in a separate furnace or in the hot pressing die prior to the application of pressure. If the magnesium fluoride is vacuum treated in a separate furnace, contact with the atmosphere prior to hot pressing is to be avoided since additional moisture can be absorbed.

The order in which the oxidizing step and the vacuum step are performed on a particular sample of magnesium fluoride is immaterial. However, if air containing moisture is used as the oxidizing gas, it is preferable to perform the vacuum treatment last. The oxidizing step and vacuum step can be conducted serially in the same furnace and it is not necessary to cool the powder to room temperature between the steps.

The method of this invention will be better understood by reference to the following examples, which illustrate certain preferred embodiments of the invention.

Example I 8 grams of magnesium fluoride powder are placed in a ceramic boat in a furnace and heated at a temperature of 500° C. for 15 minutes under an atmosphere of flowing oxygen. Following this, the flow of oxygen is discontinued and the furnace evacuated to a pressure of 1 millimeter. The temperature in the furnace is increased to 700° C. and the magnesium fluoride is heated at this temperature for 15 minutes. The treated magnesium fluoride is then immediately transferred to a vacuum hot press die where it is pressed into an optical element. Hot pressing is accomplished by heating the magnesium fluoride at a temperature of 700° C. for 30 minutes without applying any pressure. Following this, a pressure of 47,000 p.s.i. is applied for one minute. During the hot pressing treatment, the vacuum hot press die was maintained at an atmosphere of less than 1 millimeter pressure. The finished optical element has a thickness of 2.55 millimeters.

In order to establish the improvement in optical properties resulting from the pre-treatment method of this invention, 8 grams of magnesium fluoride are hot pressed into an element having a thickness of 2.45 millimeters. The hot pressing conditions are identical with those set forth above except that the oxidizing and vacuum treatments are omitted.

The visible transmission spectra of the two optical elements prepared above is set forth in FIG. 1. The solid line represents the transmission spectra of the specimen which was pre-treated according to the method of this invention while the dotted line is the spectra of the element which has had no pre-treatment. As shown by FIG. 1, the pretreatment technique of this invention results in approximately a 100% increase in the transmission of visible light.

Figure 2:
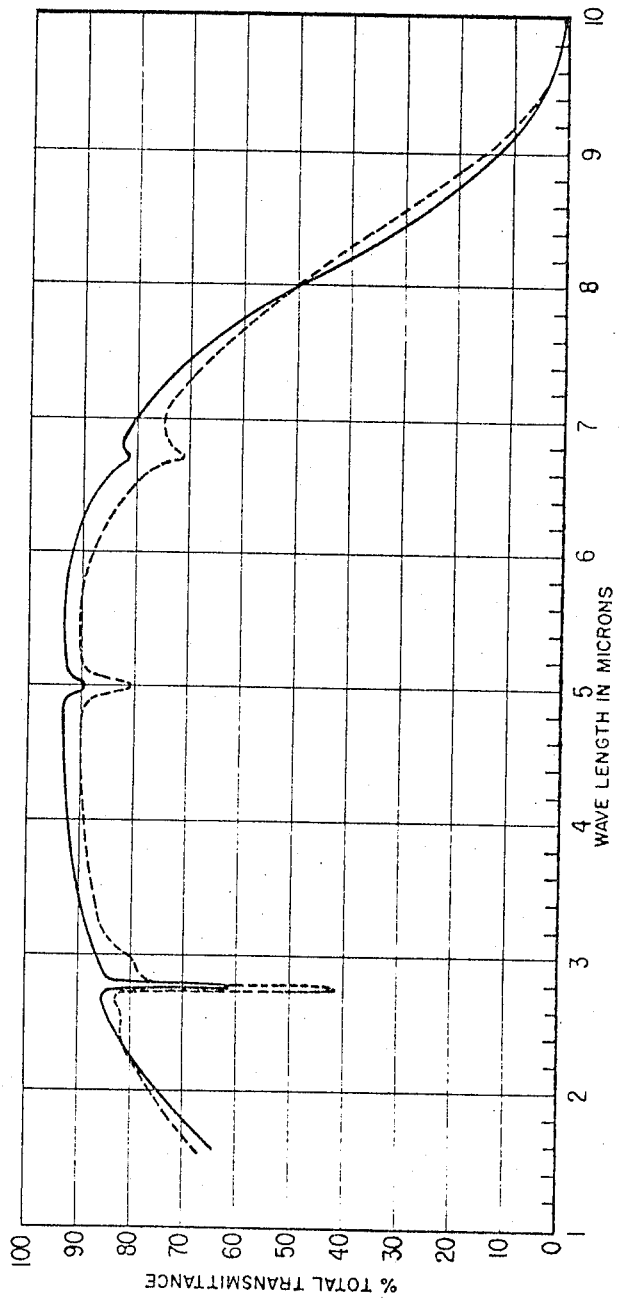
FIGURE 2 is a graph showing the effect of the method of this invention upon the infrared transmission properties of hot pressed magnesium fluoride.

FIG. 2 compares the infrared spectra of the pre-treated sample with the sample which has had no pre-treatment. In FIG. 2, the solid line represents the infrared transmission spectra of the pre-treated sample. It can readily be seen that transmission at the characteristic water absorption bands, i.e., 2.8 microns, 5 microns, and 6.7 microns, is greatly increased in the pre-treated sample.

Examples II through IV

A series of experiments is conducted to further establish the effect of pre-treatment upon the visible infrared transmission of magnesium fluoride optical elements. Table I sets forth the results of these pre-treatments. In each case, the pre-treatment conditions, hot pressing conditions, and transmission of the finished element are set forth in the table. It is apparent from Table I that a substantial improvement in optical properties is obtained when the pre-treatment technique of this invention is employed.

Thus, it can be seen that by following the method of this invention magnesium fluoride optical elements of substantially improved properties are obtained. The desirable properties achieved by this invention cannot be obtained by either treatment alone, but result from the combined effect of the two. Vacuum treatment alone, although it increases transmission at the characteristic water absorption bands in the infrared spectra, has no appreciable effect on overall transmission in the infrared or visible range. In fact, vacuum treatment alone often results in a decrease in visible transmission.

Example V

Three samples of magnesium fluoride are treated differently and then hot pressed into dense elements under identical conditions.

A first element is prepared by hot pressing 10 grams of magnesium fluoride at a temperature of 700° C., under a nitrogen atmosphere, with a pressure of 44,000 p.s.i. applied and held for 15 minutes. The magnesium fluoride had no pre-treatment. The finished element has a thickness of 2.88 mm.

A second element, 2.77 mm. thick, is prepared by heating 10 grams of magnesium fluoride for 30 minutes at a temperature of 700° C. in a vacuum of 80 microns followed by hot pressing as above.

A third element, 2.67 mm. thick, is prepared by heating 10 grams of magnesium fluoride for 30 minutes at a temperature of 700° C. in an atmosphere of air followed by hot pressing as above.

The optical properties of these elements are set forth in Table II.

TABLE I.—INFRARED AND VISIBLE TRANSMISSION OF SPECIMENS WITH AND WITHOUT PRE-TREATMENT

| | Pre-treatment conditions | | | | | [1]Hot press. conditions | | | Percent total trans. at 600 mμ | Percent trans. (specular) at— | | | Thickness, mm. |
|---|---|---|---|---|---|---|---|---|---|---|---|---|---|
| | Time (min.) | Temp. (° C.) | Atmos. | Time (min.) | Temp. (° C.) | Vacuum (microns of mercury) | Time (min.) | Temp. (° C.) | Pressure atmos. | | 2.0 μ | 5.5 μ | 6.7 μ | |
| IIa | 15 | 500 | O₂ | 15 | 700 | 110 | 15 | 700 | <1 torr | 44.0 | 77 | 90.5 | 80 | 2.06 |
| IIb | None | None | None | None | None | None | 15 | 700 | <1 torr | 32.5 | 77 | 87 | 69.5 | 2.13 |
| IIIa | 15 | 500 | O₂ | 15 | 700 | 200 | 15 | 700 | <1 torr | 32.5 | 80.5 | 94 | 81.5 | 2.42 |
| IIIb | None | None | None | None | None | None | 15 | 700 | <1 torr | 8.0 | 76 | 91 | 69 | 2.39 |
| IVa | 15 | 600 | O₂ | 15 | 700 | 275 | 15 | 700 | <1 torr | 47.0 | 71 | 91.5 | 77 | 2.76 |
| IVb | None | None | None | None | None | None | 15 | 700 | <1 torr | 6.0 | 57 | 87 | 69.5 | 2.57 |

[1] A pressure of 47,000 p.s.i. was used in hot pressing.

TABLE II

| Specimen number | Pre-Treatment | Total transmission at— | | | |
|---|---|---|---|---|---|
| | | 400 mμ, percent | 500 mμ, percent | 600 mμ, percent | 700 mμ, percent |
| Va | None | 17 | 25 | 32 | 38 |
| Vb | 30 min., 700° C., 80 microns Vac. | 10 | 17 | 24 | 30 |
| Vc | 30 min., 700° C., Air | 29 | 39 | 45 | 51 |

As shown by Table II, vacuum treatment of the magnesium fluoride resulted in a decrease in transmission in the visible range. Treatment in an oxidizing atmosphere substantially increased the visible transmission of the hot pressed element.

While there have been shown and described and pointed out the fundamental novel features of the invention as applied to the preferred embodiment, it will be understood that various omissions and substitutions and changes in the process described may be made by those skilled in the art without departing from the spirit of the invention. It is the intention, therefore, to be limited only as indicated by the scope of the following claims.

What is claimed is:

1. A process for improving the visible and infrared transmission characteristics of hot pressed bodies of magnesium fluoride comprising: heating magnesium fluoride powder in an oxygen containing atmosphere at a temperature in the range of from 350° C. to 850° C. to oxidize organic impurities contained therein, heating said magnesium fluoride powder under vacuum at a temperature in the range of from 500° C. to 900° C. for a time sufficient to remove water and reaction products thereof, and subsequently hot pressing the treated magnesium fluoride into a shaped body.

2. The process of claim 1 wherein said magnesium fluoride powder is heated in an oxidizing atmosphere at temperatures of between 450° C. and 500° C.

3. The process of claim 1, wherein said magnesium fluoride powder is heated at a temperature of between 350° C. and 850° C. in a moving stream of an oxygen-containing gas.

References Cited

UNITED STATES PATENTS

| | | | |
|---|---|---|---|
| 2,550,173 | 4/1951 | Swinehart | 23—88 |
| 3,114,601 | 12/1963 | Letter | 23—88 |
| 3,294,878 | 12/1966 | Carnall et al. | 23—88 |
| 3,301,781 | 1/1967 | Rice et al. | 23—88 |

JAMES A. SEIDLECK, *Primary Examiner.*

A. H. KOECKERT, *Assistant Examiner.*